W. POLYBLANK.
Coffee Pot.
No. 49,650. Patented Aug. 29, 1865.
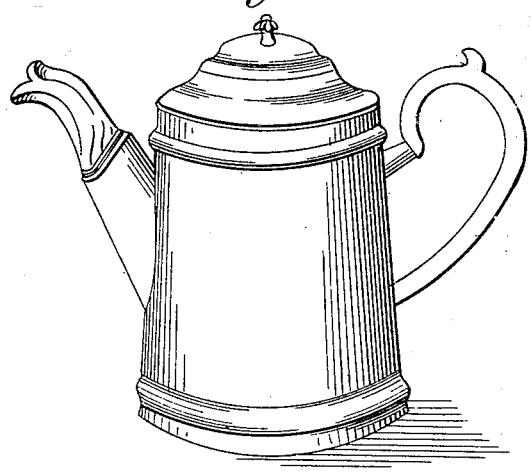
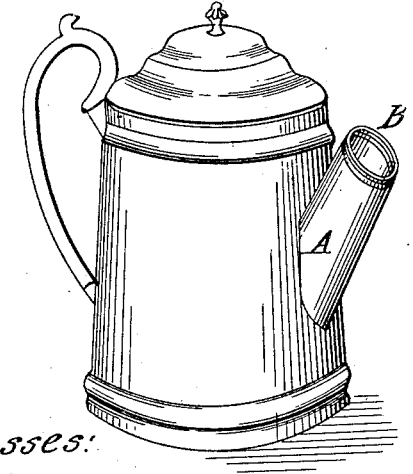
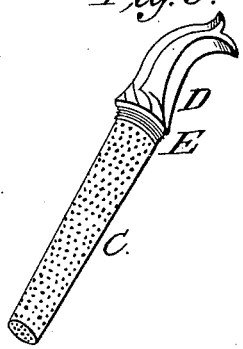

UNITED STATES PATENT OFFICE.

WILLIAM POLYBLANK, OF CLEVELAND, OHIO.

COMBINED STRAINER AND SPOUT.

Specification forming part of Letters Patent No. 49,650, dated August 29, 1865.

*To all whom it may concern:*

Be it known that I, WILLIAM POLYBLANK, of Cleveland, in the county of Cuyahoga and State of Ohio, have invented certain new and useful Improvements in the Construction of Strainers Combined with Spouts or Faucets, which can be used or attached to any vessel for straining liquids, such as tea and coffee pots, milk-strainers, &c.; and I do hereby declare that the following is a full and exact description of the construction and operation of the same, reference being had to the accompanying drawings, making a part of this specification, in which—

Figure 1 is a perspective view of a strainer and spout attached to a tea-pot. Fig. 2 is a view with the strainer and part of the spout removed. Fig. 3 is a view of the strainer with a part of the spout and ring attached.

Like letters of reference refer to like parts in the different views.

My improvements relate to constructing strainers and spouts combined. The strainer is cylindrical in form, made of fine perforated tin, woven wire, or other suitable material, so attached, by means of a screw or other device, that the strainer can be removed from the vessel and replaced, when desired, for purposes of cleaning. This form of strainer and method of attachment give the greatest possible facility and rapidity for the fluids to pass, as from one to three thousand holes can be used instead of five or ten holes, as in the ordinary plan.

In Figs. 1 and 2 are tea-pots or vessels for the liquids.

In Fig. 2, letter A is part of the spout, soldered to the vessel or pot. B is the screw or thread, soldered to the same.

In Fig. 3 is the perforated cylinder C, part of the spout D, soldered to the top ring of the screw-coupling E. Fig. 3 being screwed into Fig. 2 at B is ready for straining the liquids desired.

What I claim as my improvements, and desire to secure by Letters Patent, is—

The special arrangement of the movable cylinder-strainer C with the spout or outlet D, connected to B, Fig. 2, by the screw E, (A, the receiving-spout, being soldered to the vessel, Fig. 2,) when operating conjointly as and for the purpose set forth.

WILLIAM POLYBLANK.

Witnesses:
WILLIAM UPTON,
FRANK LEGROS.